(12) United States Patent
Issa et al.

(10) Patent No.: US 8,949,718 B2
(45) Date of Patent: Feb. 3, 2015

(54) VISUAL AUDIO LINKS FOR DIGITAL AUDIO CONTENT

(75) Inventors: Alfredo C. Issa, Apex, NC (US); Gregory M. Evans, Raleigh, NC (US)

(73) Assignee: Lemi Technology, LLC, Wilmington, DE (US)

(*) Notice: Subject to any disclaimer, the term of this patent is extended or adjusted under 35 U.S.C. 154(b) by 1304 days.

(21) Appl. No.: 12/205,483

(22) Filed: Sep. 5, 2008

(65) Prior Publication Data

US 2012/0066592 A1    Mar. 15, 2012

(51) Int. Cl.
G06F 3/00    (2006.01)
G06F 3/0485    (2013.01)

(52) U.S. Cl.
CPC .................................... *G06F 3/0485* (2013.01)
USPC ........... 715/716; 715/784; 715/758; 715/747; 725/44; 725/46

(58) Field of Classification Search
USPC ............... 715/716, 784, 758, 747; 725/44, 46
See application file for complete search history.

(56) References Cited

U.S. PATENT DOCUMENTS

| | | | |
|---|---|---|---|
| 5,640,193 A | 6/1997 | Wellner | |
| 5,905,865 A | 5/1999 | Palmer et al. | |
| 5,940,831 A | 8/1999 | Takano | |
| 6,530,084 B1 | 3/2003 | Del Sesto et al. | |
| 6,745,368 B1 | 6/2004 | Boucher et al. | |
| 6,774,908 B2 | 8/2004 | Bates et al. | |
| 6,907,570 B2 | 6/2005 | Amir et al. | |
| 7,036,083 B1 | 4/2006 | Zenith | |
| 7,149,411 B2 | 12/2006 | Jun et al. | |
| 7,319,806 B1 | 1/2008 | Willner et al. | |
| 7,356,830 B1 | 4/2008 | Dimitrova | |
| 7,362,950 B2 | 4/2008 | Jun et al. | |
| 2002/0038383 A1 | 3/2002 | Ullman et al. | |
| 2002/0069218 A1 | 6/2002 | Sull et al. | |
| 2002/0194608 A1 | 12/2002 | Goldhor | |
| 2003/0146940 A1 | 8/2003 | Ellis et al. | |
| 2004/0098754 A1 | 5/2004 | Vella et al. | |
| 2004/0205087 A1* | 10/2004 | Dorsey et al. ............... | 707/104.1 |
| 2004/0255336 A1 | 12/2004 | Logan et al. | |
| 2005/0010952 A1* | 1/2005 | Gleissner et al. ............... | 725/46 |
| 2005/0125821 A1 | 6/2005 | Li et al. | |
| 2005/0283475 A1 | 12/2005 | Beranek et al. | |

(Continued)

OTHER PUBLICATIONS

Michael Miller, Youtube 4 You, (Apr. 26, 2007).*

(Continued)

*Primary Examiner* — Amy Ng
*Assistant Examiner* — Di Xiao

(57) ABSTRACT

Methods and systems for providing visual audio links for digital audio content include playing the digital audio content on an electronic device that has a display; displaying on the display visual audio links associated with terms of relevance from the digital audio content as the terms of relevance are played during playing of the digital audio content, wherein each of the visual audio links is a reference to additional content associated with the corresponding term of relevance; in response to receiving a user's selection of one of the visual audio links, presenting the additional content associated with the corresponding term of relevance, wherein the user is granted a license to the additional content; and when presentation of the additional content completes, playing the digital audio content at a point where the corresponding term of relevance was mentioned, such that the user is granted rewind rights based on the terms of relevance.

27 Claims, 5 Drawing Sheets

(56) References Cited

U.S. PATENT DOCUMENTS

| | | | |
|---|---|---|---|
| 2006/0004704 | A1 | 1/2006 | Gross |
| 2006/0161952 | A1 | 7/2006 | Herz et al. |
| 2006/0174293 | A1 | 8/2006 | Ducheneaut et al. |
| 2007/0033531 | A1 | 2/2007 | Marsh |
| 2007/0094687 | A1 | 4/2007 | Russell |
| 2007/0124795 | A1 | 5/2007 | McKissick et al. |
| 2007/0143493 | A1 | 6/2007 | Mullig et al. |
| 2007/0204310 | A1 | 8/2007 | Hua et al. |
| 2007/0219949 | A1 | 9/2007 | Mekikian |
| 2007/0220552 | A1 | 9/2007 | Juster et al. |
| 2007/0261095 | A1* | 11/2007 | Petrisor et al. ............... 725/131 |
| 2007/0299870 | A1 | 12/2007 | Finch |
| 2008/0065693 | A1 | 3/2008 | Malik |
| 2008/0086456 | A1 | 4/2008 | Rasanen et al. |
| 2008/0086688 | A1 | 4/2008 | Chandratillake et al. |
| 2008/0092168 | A1* | 4/2008 | Logan et al. ............... 725/44 |
| 2008/0109750 | A1* | 5/2008 | Lin-Hendel ............... 715/785 |
| 2008/0124052 | A1 | 5/2008 | Sardera |
| 2008/0127268 | A1 | 5/2008 | Bergeron et al. |
| 2008/0140523 | A1 | 6/2008 | Mahoney et al. |
| 2008/0147501 | A1* | 6/2008 | Gilliam ............... 705/14 |
| 2008/0155461 | A1* | 6/2008 | Ozaki ............... 715/784 |
| 2008/0281689 | A1* | 11/2008 | Blinnikka et al. ............... 705/14 |
| 2009/0119166 | A1* | 5/2009 | Taylor et al. ............... 705/14 |
| 2009/0180753 | A1 | 7/2009 | Kitazato |

OTHER PUBLICATIONS

"Asterpix Interactive Video—Frequently Asked Questions," at <http://www.video.asterpix.com/help>, found on the Internet Archive, dated May 13, 2009, appears to date back as early as Oct. 2007, printed May 13, 2011, 8 pages.

Bolle, R. M. et al, "Video query: Research directions," IBM Journal of Research and Development, vol. 42, Issue: 2, Digital Object Identifier: 10.1147/rd.422.0233, Publication Date: Mar. 1998, pp. 233-252, copyright 1998, IBM, 20 pages.

Francisco-Revilla, Luis, "A Picture of Hypervideo Today," at <http://www.csdl.tamu.edu/~l0f0954/academic/cpsc610/p-1.htm>, 1998, printed Sep. 6, 2011, 15 pages.

"Hypermedia," Wikipedia, found at <http://en.wikipedia.org/wiki/Hypermedia> on Internet Archive, dated Nov. 4, 2007, printed Jun. 1, 2011, 2 pages.

"Hypervideo," Wikipedia, found at <http://en.wikipedia.org/wiki/Hypervideo> on Internet Archive, dated Oct. 29, 2007, printed Jun. 1, 2011, 5 pages.

Iskrocki, "How to disable YouTube's new related videos feature," Jun. 7, 2007, at <http://blogs.oracle.com/lskrocki/entry/how_to_disable_youtube_s>, printed Dec. 12, 2011, 6 pages.

Pfeiffer, Silvia, "Architecture of a Video Web—Experience with Annodex," at <http://www.w3.org/2007/08/video/positions/annocex.pdf>, dated Nov. 21, 2007, Position Statement W3C Video Workshop, Dec. 12-13, 2007, San Jose, California and Brussels, Belgium, 5 pages.

Tsinaraki, C. et al., "A Video Metadata Model Supporting Personalization & Recommendation in Video-based Services," Proc. ofMDDE Workshop (in conjunction with RETIS), Lyon, France, Jul. 2001, pp. 104-109, found at <http://citeseer.ist.psu.edu/viewdoc/summary?doi=10.1.1.104.3610>, 6 pages.

Weng, Chung-Yi et al., "Movie Analysis Based on Roles' Social Network," In Proceedings of IEEE International Conference on Multimedia and Expo, Jul. 2-5, 2007, Beijing, China, pp. 1403-1406, found at <http://www.cmlab.csie.ntu.edu.tw/new_cml_website/media/publications/Weng-2007-MAB.pdf>, 4 pages.

Worring, Marcel and Snoek, Cees, "SAMT 2006—Semantic Indexing and Retrieval of Video," SAMT 2006 Conference in Athens, Greece, Dec. 6-8, 2006, 172 pages.

* cited by examiner

VISUAL AUDIO LINKS FOR DIGITAL AUDIO CONTENT

BACKGROUND OF THE INVENTION

Talk shows broadcast over Internet radio (also known as streaming radio) are multiplying quickly, as evidenced by the success in the genre by satellite radio network operators. Many Internet radio stations are associated with the corresponding traditional or terrestrial radio station or network (e.g., ESPN® and the NFL Network®). The most common way to distribute Internet radio is via streaming technology that presents listeners with a continuous stream of audio, which depending on the type of media player application 34 used to play the stream, may have little or no control over playback.

Although Internet talk radio is experiencing increasing popularity, when listeners hear topics of interest during a program, it is left up to the listeners on how to best follow up to learn more about the topics. For example, some listeners may choose to perform manual web searches on those topics. In many cases, the listeners may postpone performing a web search until after the program has ended to keep from being distracted. One disadvantage of waiting, however, is that the likelihood the listeners will forget or loose interest in performing the search will increase with time.

In addition, much information related to many topics discussed during the programs may be associated with premium content that is not available over the Internet to the general public. For example, if a listener hears an NFL Network show about NFL Greats, the user may be unable to find over the Internet, much less view, video footage owned by the NFL Network regarding NFL Greats, which are rights restricted.

BRIEF SUMMARY OF THE INVENTION

Exemplary embodiments provide methods and systems for providing visual audio links for digital audio content. Aspects of the exemplary embodiment include playing the digital audio content on an electronic device that has a display; displaying on the display visual audio links associated with terms of relevance from the digital audio content as the terms of relevance are played during playing of the digital audio content, wherein each of the visual audio links is a reference to additional content associated with the corresponding term of relevance; in response to receiving a user's selection of one of the visual audio links, presenting the additional content associated with the corresponding term of relevance, wherein the user is granted a license to the additional content; and when presentation of the additional content completes, playing the digital audio content at a point where the corresponding term of relevance was mentioned, such that the user is granted rewind rights based on the terms of relevance.

DETAILED DESCRIPTION OF THE INVENTION

The present invention relates to visual audio links for digital audio content. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiments provide methods and systems for providing visual audio links for digital audio content, such as for an Internet talk radio program, to provide a listener with access to additional content associated with the program while the program is playing. As an electronic device, such as a handheld or mobile device, plays the digital audio content, visual audio links, such as hyperlink icons, are displayed on the device's display that are associated with terms of relevance detected in the narrative of the digital audio content content. The visual audio links are references to additional content associated with the terms of relevance, and may be associated with rights granted to the additional content, such that when the listener selects one of the visual audio links, the additional content is presented to the user. The user of the electronic device may also use the visual audio links as a way to scroll back and navigate to a previous position in the program where a previous topic was mentioned.

Figure 1:
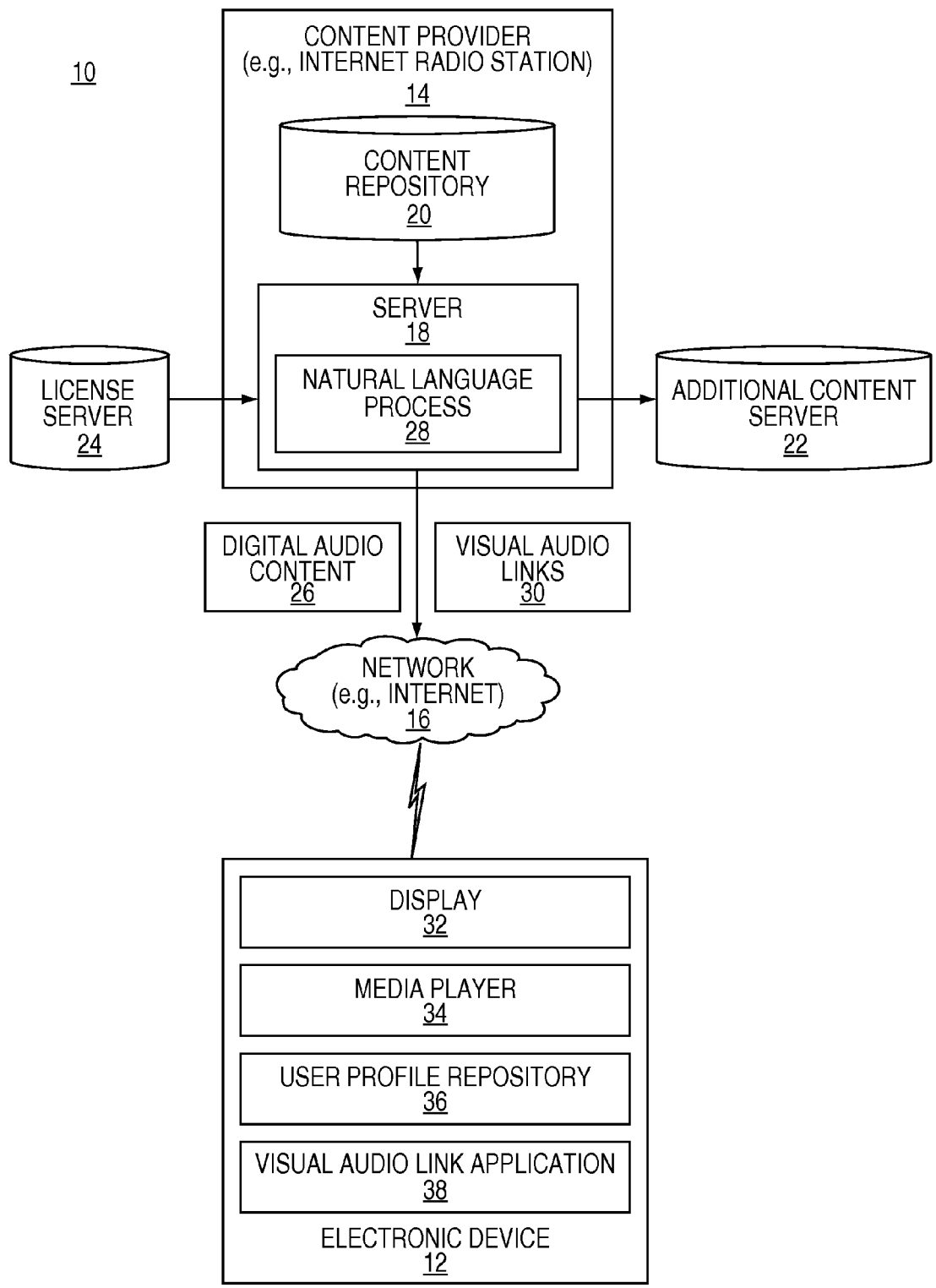
FIG. 1 is a diagram illustrating a system for providing visual audio links for an Internet radio program.

FIG. 1 is a diagram illustrating a system for providing visual audio links for digital audio content. The system 10 includes an electronic device 12 in communication with a content provider 14 over a wired or wireless interface to a network 16, such as the Internet. The content provider 14 may include a server 18 (e.g., a streaming server), a content repository 20, an additional content server 22, and a license server 24. In one embodiment, the content provider 14 may comprise an Internet radio station, a satellite radio station, or a multicast or a unicast internet broadcaster, that provides digital audio content 26 over the network via the server 18.

In one embodiment, the digital audio content 26 may primarily comprise audio programs, such as from an Internet talk radio station, for example. In one embodiment, the digital audio content 26 may comprise a streaming audio format that is streamed across the network by the server 18 and played by the electronic device 12 in real-time (e.g., Internet radio streams or webcasts). Common streaming audio formats include MP3, Ogg Vorbis, Windows Media Audio, RealAudio and HE-AAC (sometimes called aacPlus). In one embodiment, such as where content of an digital audio content 26 comprises a talk show program, for example, the content may be obtained from a live feed (not shown).

In another embodiment, the digital audio content 26 may comprise an audio file that is downloaded from the server 18 to the electronic device 12 and played once received by the electronic device 12 (e.g., podcasts). Although in the exemplary embodiment, the digital audio content 26 comprises audio programs of Internet radio, in another embodiment, the digital audio content 26 may comprise any words that may be converted into text from which terms of relevance may be detected, such as songs, for example. Thus, the digital audio content 26 may also include an MP3 file.

The content repository 20 stores terms of relevance (e.g., keywords and phrases) that may be associated with the additional content stored by the additional content server 22. When requested by the server 18, the license server 24 grants licenses to the additional content stored by the additional content server 22 to enable users of the electronic device 12 to access the additional content.

In one embodiment, the server 18 may execute a natural language process 28 that functions to detect terms of relevance in text of the audio program comprising the digital audio content 26 based on a context of the audio program, and to associate visual audio links 30 with the terms of relevance, where each of the visual audio links 30 is a reference to additional content. Although the natural language process 28 is shown as a single component and executing on a single server, the functionality of the natural language process 28 may be implemented using a greater number of components and may execute on more than one server.

The electronic device 12 may include a display 32, a media player application 34, a user profile repository 36, and a visual audio link application 38. In one embodiment, the electronic device 12 may comprise any device having a display 32, such as a mobile or handheld device, including a cell phone, personal digital assistant, MP3 player, and the like; as well as a larger electronic device, including a laptop, a PC, or a kiosk, for instance.

The media player application 34 may be capable of playing the digital audio content 26, and in some embodiments, video files (not shown). Audio is played through an output device (see FIG. 4) of the electronic device 12, and video may be displayed on the display 32. The user profile repository 36 may store one or more user profiles that contain term and topic preferences that are used by the visual audio link application 38 to control display of the visual audio links 30. The user profile repository 36 may be implemented as a database, a table, or a file.

Figure 2:
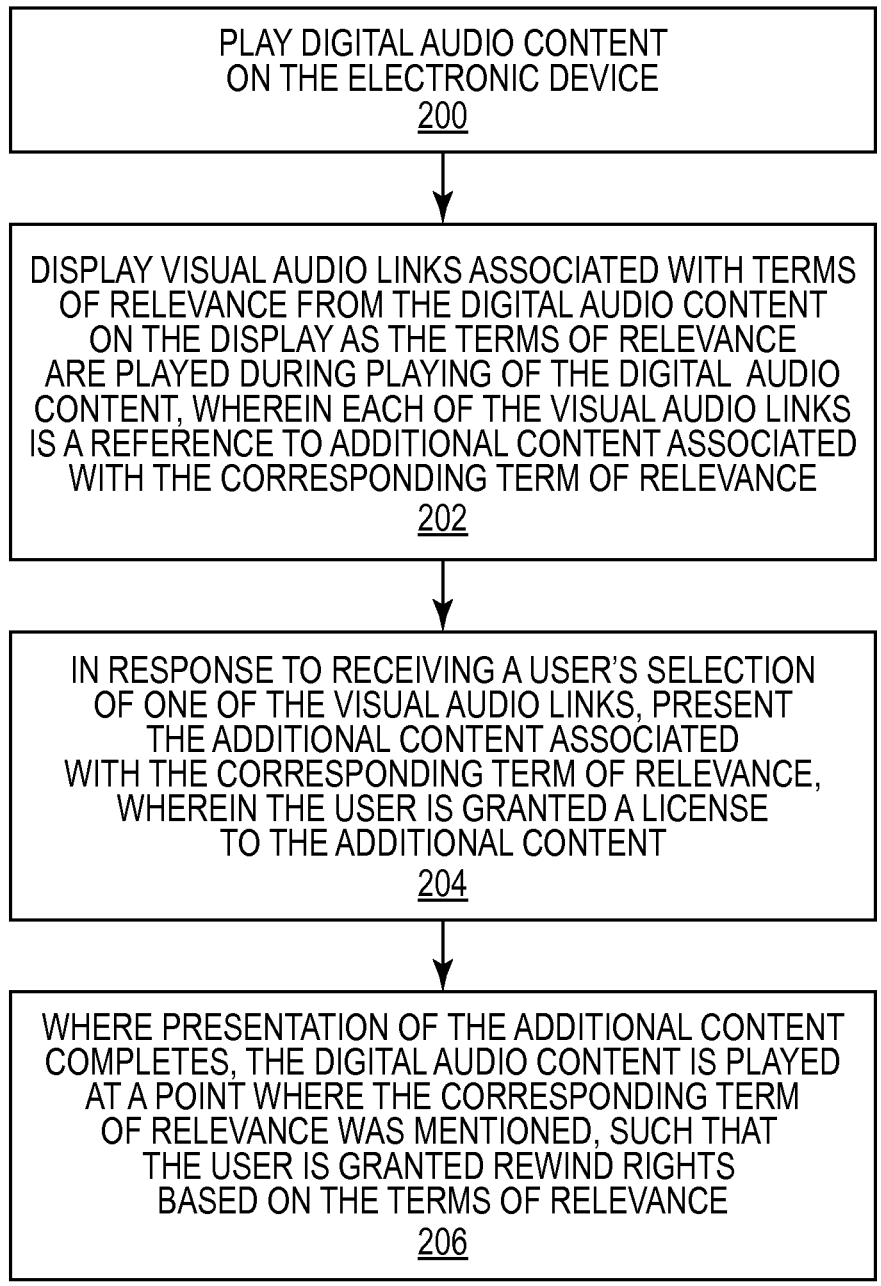
FIG. 2 is a flow diagram illustrating a process for providing visual audio links for digital audio content.

FIG. 2 is a flow diagram illustrating a process for providing visual audio links 30 for digital audio content. The process may begin by playing the digital audio content 26 on the electronic device 12 (block 200). Visual audio links 30 associated with terms of relevance from the digital audio content are displayed on the display 32 as the terms of relevance are played during the playing of digital audio content, wherein each of the visual audio links 30 is a reference to additional content associated with the corresponding term of relevance (block 202).

Figure 3:
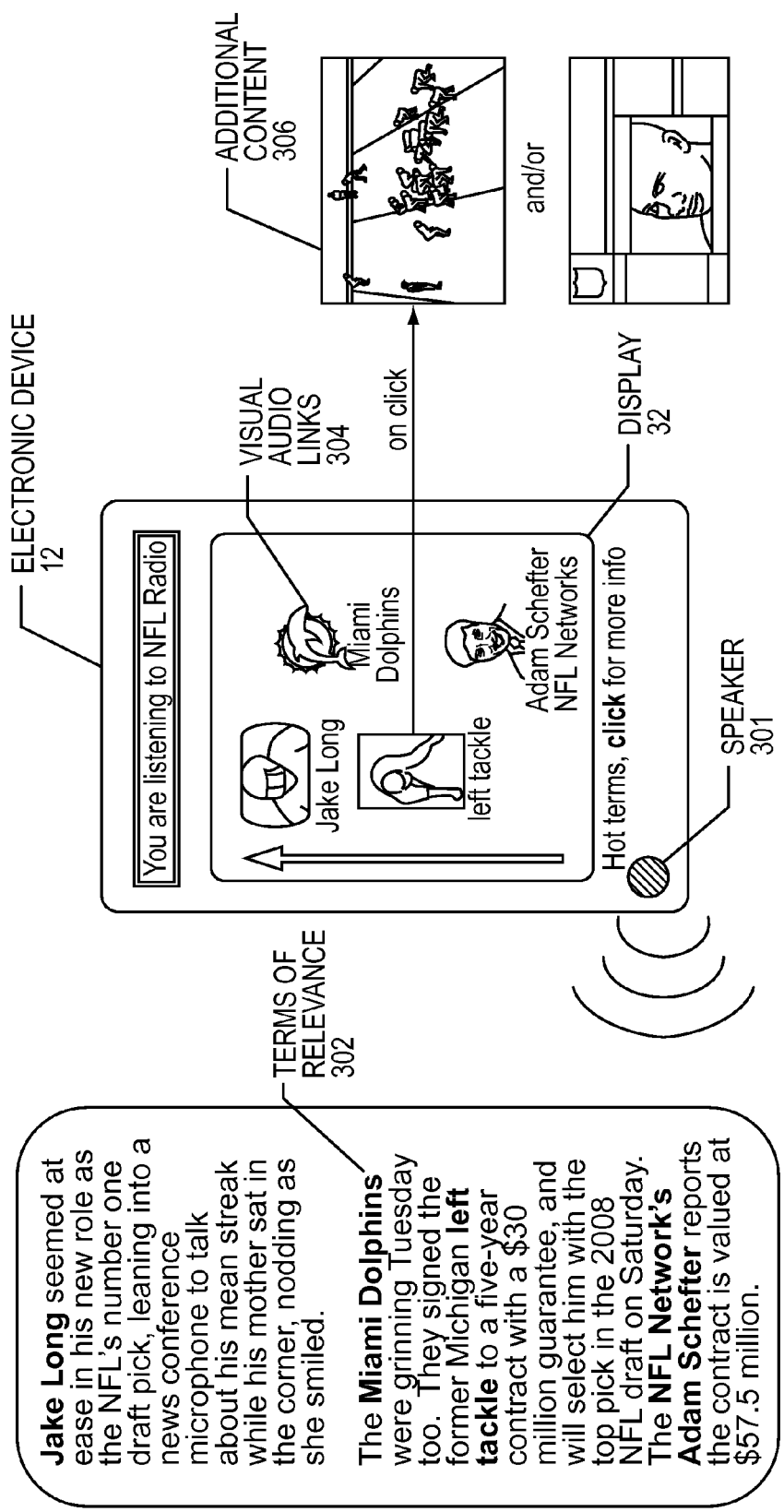
FIG. 3 is a block diagram illustrating an example electronic device in operation according to an exemplary embodiment.

FIG. 3 is a block diagram illustrating an example electronic device 12 in operation according to an exemplary embodiment. As the media player application 34 in the electronic device 12 plays the digital audio content, audio of the program narrative 300 may be audible to the user of the electronic device 12 from an audio output device 301 (e.g., speaker, earbuds, headphones and the like). In this example, the digital audio content originates from an NFL radio Internet radio program. Based on the context of the program, certain terms of relevance 302 have been identified in the program narrative 300 (shown highlighted) that listeners might find of interest.

Visual audio links 304 associated with terms of relevance 302 are displayed on the display 32 as the terms of relevance are narrated/played from the digital audio content. In one embodiment, the visual audio links 304 may represent hyperlinks that are displayed as a text, an icon, a graphic, or a combination thereof. In the example shown, four visual audio links 304 are displayed corresponding to four terms of relevance 302, and the visual audio links 304 are displayed as a combination of text, icons and graphics depicting the term of relevance 302. Although the visual audio links 304 are shown displayed in a two column format, visual audio links 304 may be displayed in a variety of formats.

According to the exemplary embodiment, the visual audio links 304 may scroll across the display 32 as the digital audio content is played. For example, the visual audio links 304 may scroll from the bottom to the top or from the top to the bottom of the display 32 (as shown by the arrow). In one specific embodiment, the visual audio links 304 may appear at the bottom of the display and scroll to the top of the display, after which the visual audio links 304 disappear and are replaced by new ones as new terms of relevance are mentioned in the program. In the example of FIG. 3, the arrow could represent a scroll bar that allows the user to scroll up and view previously mentioned topics of discussion via the visual audio links 304.

By displaying the visual audio links 304 simultaneously with the audible program narrative, a user can look at the visual audio links 304 and quickly know what topics have been discussed in the program. If the user has been distracted, this view gives the user a quick review of what has been discussed.

Referring again to FIG. 2, in response to receiving a user's selection of one of the visual audio links, the additional content 306 associated with the corresponding term of relevance is presented, wherein the user is granted a license to the additional content 306 (block 204). In one embodiment, all the licenses to all the additional content may be granted previous to streaming/downloading to the electronic device 12 and the electronic device 12 may validate each license when the corresponding additional content is accessed. In another embodiment, each license may be granted at the time the user selects the visual audio link 304 and the license may be validated at the same time. If the electronic device 12 is equipped with a touchscreen, the user may select the visual audio link 304 by clicking or tapping the visual audio link 304. Otherwise, an appropriate input device may be used.

Once selected, the selected visual audio link 304 is used as a reference to retrieve the additional content 306 associated with the corresponding term of reference and to the rights to the additional content, if necessary. The additional content 306 may comprise video, audio, text, a webpage, or any combination thereof.

As shown in the example of FIG. 3, the user has selected the visual audio link 304 for "left tackle." In response, the user is granted access rights to NFL video and to special NFL.com content that may not be available to the general public.

In one embodiment, the rights granted may be restricted by a time duration. For example, the time duration may be configured such that the license granted to the additional content 306 automatically expires at the end of a streaming program; expires at a predetermined time after the beginning or ending of streaming downloading, or playing the digital audio content; or expires at a predetermined time and date.

In one embodiment, once the user selects one of the visual audio links 304, playing of the digital audio content may be automatically paused while the additional content 306 is played. When presentation of the additional content 306 completes, playback of the original digital audio content may automatically continue from the previous pause location.

Referring again to FIG. 2, when presentation of the additional content 306 completes, the digital audio content is played at a point where the corresponding term of relevance was mentioned, such that the user is granted rewind rights based on the terms of relevance (block 206). Allowing the user to click on any of the visual audio links 304 provides the user with a method to scroll back and navigate to a previous position in the program (using an internal buffer of the media player application 34) where previous topics were mentioned. In another embodiment, the visual audio link application may also allow the user to scroll forward through visual audio links 304 to provide both the user with fast-forward rights as well as rewind rights.

Notice that if the user clicks on a visual audio link 304 that is current to the discussion in the program narrative 300, then completion of the additional content 306 may have no effect on play back, since play back may begin at the point where the digital audio content was paused.

Figure 4:
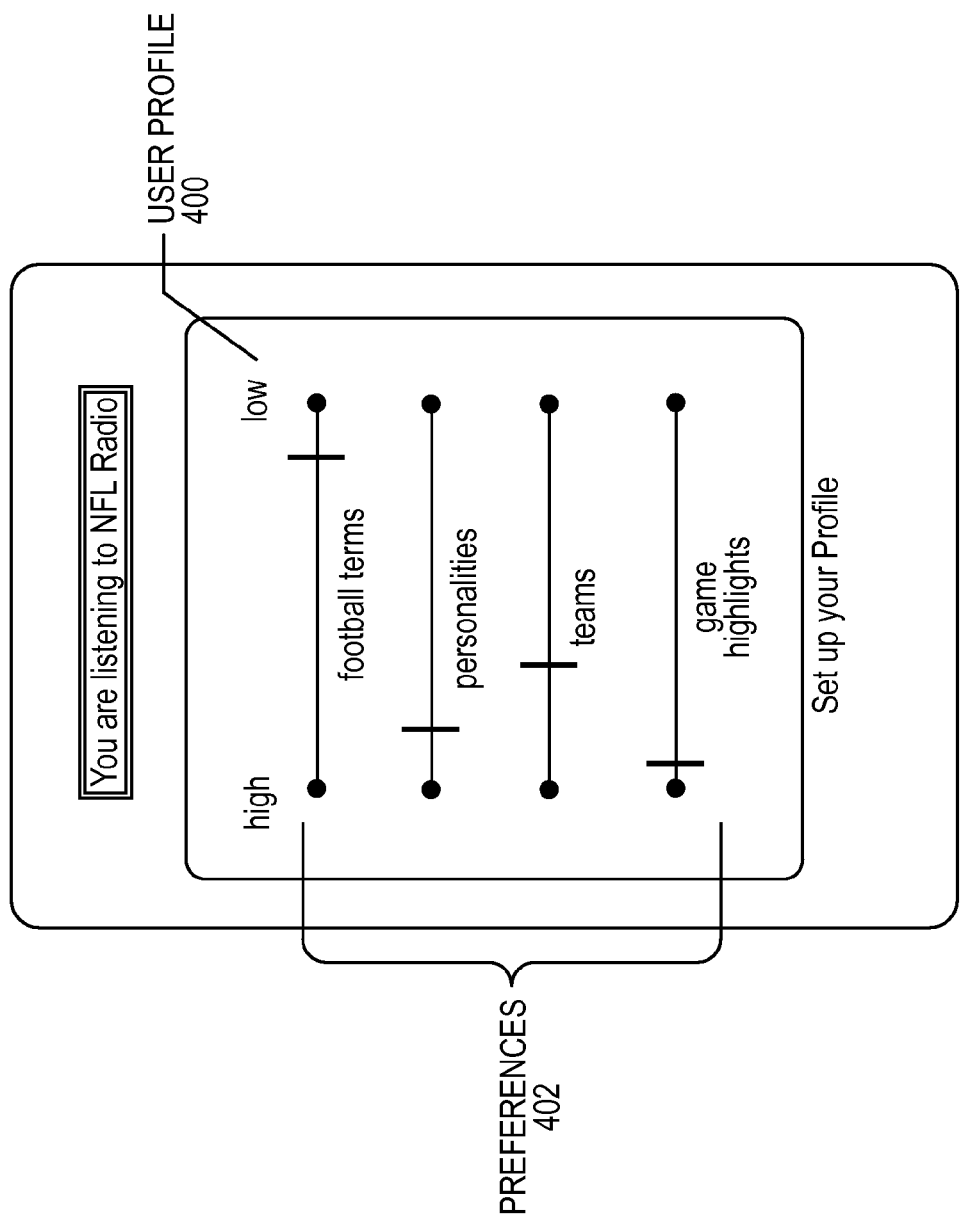
FIG. 4 is a diagram illustrating display of a user profile on the electronic device.

FIG. 4 is a diagram illustrating a display of a user profile on the electronic device 12. The user profile 400 is preferably stored in the user profile repository 36 in the electronic device 12 and comprises terms and topic preferences 402 that control how the visual audio link application 38 displays the visual audio links 304 on the display. According to an exemplary embodiment, the user may customize a user profile 400 for each radio program the user subscribes to in order to control the type of additional content 306 that is accessed via the visual audio links 304.

In the example shown in FIG. 4, assume that the user profile 400 shown is customized for an NFL network Internet radio program. The preferences 402 that may be set for the NFL network Internet radio program include "football terms", "personalities", "teams" and "game highlights". Preference setting values or weights from high to low may be assigned to each preference using a sliding scale (although any method could be used to assign values). This user feels that he has sufficient football knowledge, so the user sets the "football terms" preferences 402 to a low value setting. He is very interested in football personalities and game highlights, and somewhat interested in football teams, and sets those preferences 402 accordingly.

In operation, the visual audio link application 38 running on the user's electronic device 12 will access the user's user profile 400 and filter which visual audio links 304 are displayed (and therefore what additional content 306 is made available) so that the user will get more premium content in which he is interested.

In one embodiment, the preference value settings in the user profile 400 may be used to control the speed at which the visual audio links 304 scroll to the top of the screen. In one embodiment, for example, the visual audio links 304 may be made to appear as bubbles that float from the bottom of the display 32 to the top. A preference having a high value would be weighted heavier, so the bubble would float to the surface slowly, giving the user a longer time to select it. In contrast to a less relevant preference having a low value setting that would scroll (float) to the surface at a much faster pace. This provides the user with a way to control how visual audio links 304 are displayed and how quickly the visual audio links 304 disappear off the screen, and to provide a visual feedback of how the visual audio links 304 associated with terms of relevance in the digital audio content are weighted to the user profile 400. So, for example, the user noticing a visual audio link 304 of an interesting topic scrolling quickly off the display 32 may be a visual cue to the user that the preferences in his or her profile need adjusting.

Figure 5:
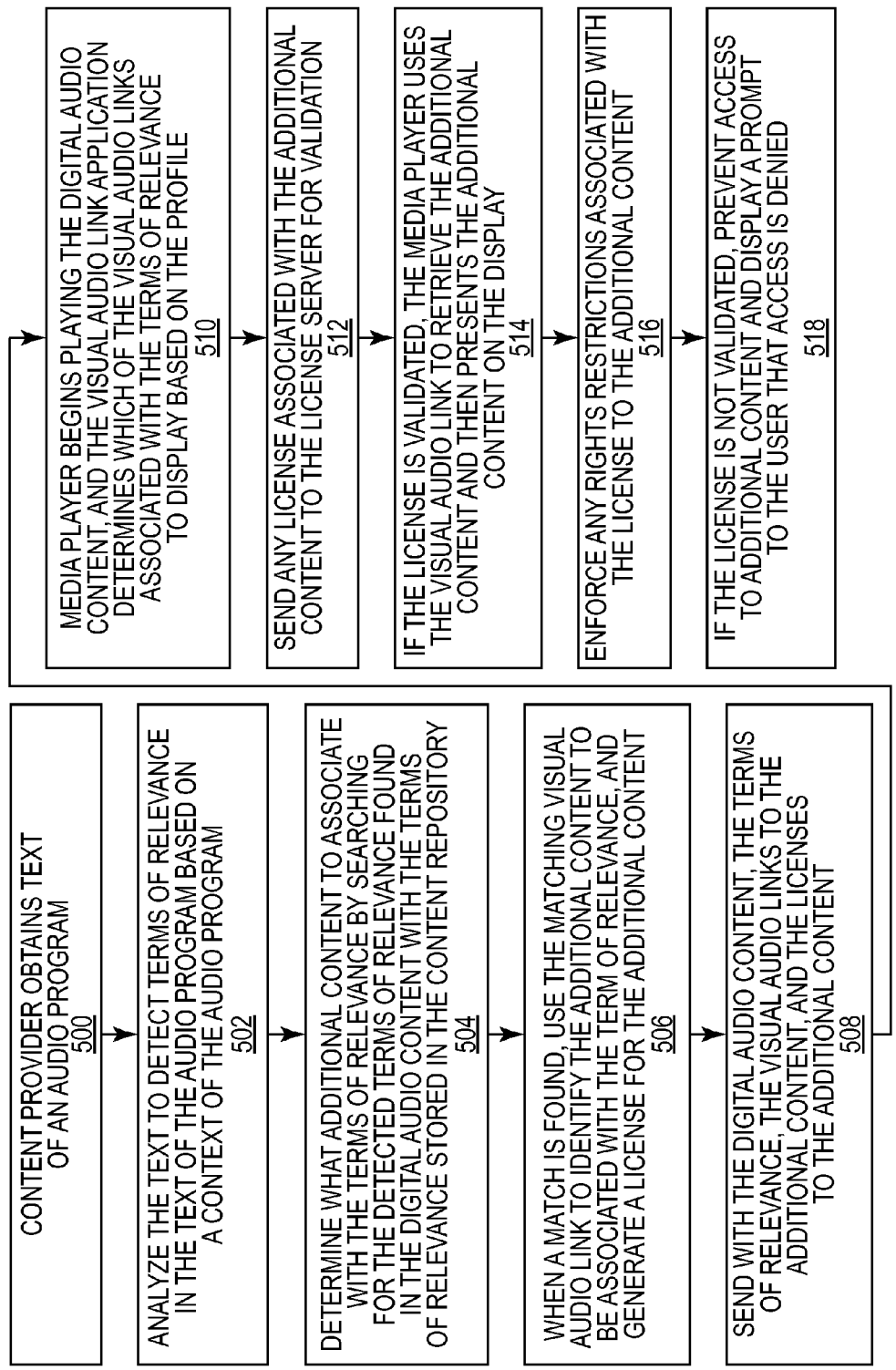
FIG. 5 is a flow diagram illustrating a process for associating visual audio links with digital audio content in further detail.

FIG. 5 is a flow diagram illustrating a process for associating visual audio links 30 with digital audio content in further detail. FIG. 5 will be explained in conjunction with the components from FIG. 1. In an exemplary embodiment, the visual audio links 30 and licenses are associated with digital audio content 26 prior to delivery to the electronic device 12. The visual audio links 30 and licenses may be associated with the digital audio content 26 up front or during the streaming. In one embodiment, a third party may analyze the digital audio content 26 and provide the visual audio links 30 and licenses for the content provider 14. In this embodiment, the third party would comprise the server 18, the natural language process 18, the content repository 20, the license server 24 and the additional content server 22, and would intercept the digital audio content 26 from a content provider 14 over the network.

FIG. 5 illustrates an exemplary embodiment where the content provider associates the visual audio links 30 and licenses with the digital audio content 26. The process begins by the content provider obtaining text of an audio program (block 500). In one embodiment, the natural language process 28 may convert the digital audio content from audio to text. In another embodiment, text from a closed-captioned system may be used to obtain the text. The natural language process 28 analyzes the text to detect terms of relevance in the text of the audio program based on a context of the audio program (block 502).

The natural language process 28 determines what additional content 306 to associate with the terms of relevance by searching for the detected terms of relevance found in the digital audio content with the terms of relevance stored in the content repository (block 504).

When a match is found, the natural language process 28 uses the matching visual audio link 30 to identify the additional content 306 to be associated with the term of relevance, and generates a license for the additional content 306, which is stored in the license server 24, for subsequent validation (block 506). Based on the identification of the additional content 306, the generated license includes the appropriate grant of rights and restrictions.

License rights to the additional content 306 may be implemented using digital right management (DRM), obfuscation, and/or keys. In DRM, a license to use the additional content 306 is associated with the digital audio content and detected by the electronic device 12. The license is provided to the license server 24 for verification when the additional content 306 is accessed, which may restrict access to the additional content 306 to particular times and/or locations. In obfuscation, the additional content 306 is hidden from the public Internet and is instead made available via the visual audio links 30 associated with the digital audio content. With keys, a key associated with the digital audio content, the key is extracted by the media player application 34 and then used to decrypt and access the additional content 306.

The natural language process 28 sends with the digital audio content, the terms of relevance, the visual audio links 30 to the additional content 306, and the licenses to the additional content 306 (block 508). In one embodiment, the visual audio links 30 are sent with timestamps such that display of the visual audio links 30 can be synchronized to the audio program as the audio program is played. In the embodiment where the audio program is radio stream, steps 504 through 508 may be performed in real-time. In a further embodiment, advertisements in the form of sponsoring logos and icons also may be associated with the terms of relevance and/or the additional content and displayed.

In one embodiment, the visual audio links 30 and licenses may be sent as part of the digital audio content. In another embodiment, the visual audio links 30 and licenses may be sent separate from the digital audio content. In the embodiment where the digital audio content is a streaming file, the server 18 may embed the visual audio links 30 and licenses directly into the outgoing stream.

In an alternative embodiment, the visual audio links 30 and licenses may be associated with the terms of relevance by the electronic device 12 instead of the server 18. In this embodiment, the natural language process 28 may be located on the electronic device 12. The electronic device 12 would receive the digital audio content, perform audio-to-text conversion, perform natural language process 28 to determine terms of relevance, and bind the additional content 306 to the terms of relevance via the visual audio links 30 through communication with the content repository 20. In this embodiment, the electronic device 12 may pull images of the visual audio links 30 in real-time either from the network 16, or even locally if pre-stored, and determine which of the visual audio links 30 to display based on the user profile 400.

Alternatively, the electronic device 12 may receive the digital audio content and the terms of relevance from the server 18, but not the visual audio links 30. In this case, the electronic device 12 may just need to associate the terms of relevance with additional content 306 via the visual audio links 30, and then determine which ones of the visual audio links 30 to display based on the user profile 400.

On the electronic device 12, once the media player application 34 begins playing the digital audio content, the visual audio link application 38 determines which of the visual audio links 30 associated with the terms of relevance to display based on the user profile 400 (block 510). The visual audio link application 38 displays the visual audio links 30 and any associated graphics (block 510).

In response to receiving a user selection of one of the displayed visual audio links 30, a license validator for the media player application 34 sends any license associated with the additional content to the license server 24 for validation (block 512). If the license is validated, the media player application 34 uses the visual audio link 30 to retrieve the additional content 306 and then presents the additional content 306 on the display (block 514). The media player application 34 also enforces any rights restrictions associated with the license to the additional content 306 (e.g., license duration etc.) (block 516). If the license is not validated, the media player application 34 prevents access to additional content and may display a prompt to the user that access is denied (block 518).

A method and system for providing visual audio links for digital audio content, such as an Internet radio audio stream, has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM and is to be executed by a processor. Accordingly, many modifications may be made by one of ordinary skill in the art without departing from the spirit and scope of the appended claims.

We claim:

1. A method, comprising:
    playing digital audio content on an electronic device, the electronic device having a display;
    displaying on the display visual audio links associated with terms of relevance from content of the digital audio content, each visual audio link corresponding to a term of relevance displayed only as content having the term of relevance is played during playing of the digital audio content, wherein each of the visual audio links is a reference to additional content associated with a corresponding term of relevance from the terms of relevance;
    in response to receiving a user's selection of one of the visual audio links, presenting the additional content associated with the corresponding term of relevance, wherein the user is granted a license to the additional content; and
    when presentation of the additional content completes, playing the digital audio content at a point where the corresponding term of relevance was mentioned, such that the user is granted rewind rights based on the terms of relevance.

2. The method of claim 1 wherein the visual audio links comprise hyperlinks that are displayed as at least one of a text, an icon, and a graphic that scroll across the display as the digital audio content is played.

3. The method of claim 2 further comprising using a preference value settings in a user profile to control a speed at which the visual audio links scroll.

4. The method of claim 2 wherein the visual audio links appear to float from a bottom of the display to a top of the display.

5. The method of claim 1 wherein the license is restricted by a time duration.

6. The method of claim 5 wherein the time duration is configured such that the license to the additional content automatically expires at least one of:
    an end of a streaming program;
    at a predetermined time after at least one of a beginning or an ending of at least one of streaming, downloading, and playing the digital audio content; and
    at a predetermined time and date.

7. The method of claim 1 wherein presenting the additional content further comprises at least one of presenting video, audio, text, and a web page.

8. The method of claim 1 further comprising in response to receiving the user's selection of one of the visual audio links, pausing the playing of the digital audio content, and automatically continuing playback of the digital audio content when presentation of the additional content completes.

9. The method of claim 8 further comprising receiving the user's selection of one of the visual audio links to enable the user to scroll back and navigate to a previous position in the digital audio content where previous topics were mentioned.

10. The method of claim 8 further comprising enabling the user to scroll forward through the visual audio links to provide the user with fast-forward rights.

11. The method of claim 1 further comprising receiving the visual audio links with the digital audio content.

12. The method of claim 1 further comprising receiving the visual audio links separately from the digital audio content.

13. An electronic device, comprising:
    a display;
    at least one processor in communication with the display;
    memory containing software executable by the at least one processor whereby the electronic device is operative to:
    play digital audio content display visual audio links associated with terms of relevance from the digital audio content, each visual audio link corresponding to a term of relevance displayed only as content having the term of relevance is played during playing of the digital audio content, wherein each of the visual audio links is a reference to additional content associated with a corresponding term of relevance from the terms of relevance; and
    in response to receiving a user's selection of one of the visual audio links, present the additional content associated with the corresponding term of relevance, wherein the user is granted a license to the additional content; and wherein when presentation of the additional content completes the media player plays the digital audio content at a point where the corresponding term of relevance was mentioned, such that the user is granted rewind rights based on the terms of relevance.

14. The electronic device of claim 13 wherein the visual audio links comprise hyperlinks that are displayed as at least one of a text, an icon, and a graphic that scroll across the display as the digital audio content is played.

15. The electronic device of claim 14 when preference value settings in a user profile control a speed at which the visual audio links scroll.

16. The electronic device of claim 13 when the visual audio links appear to float from a bottom of the display to a top of the display.

17. The electronic device of claim 13 wherein the license is restricted by a time duration.

18. The electronic device of claim 17 wherein the time duration is configured such that the license to the additional content automatically expires at least one of:
an end of a streaming program;
at a predetermined time after at least one of a beginning or an ending of at least one of streaming, downloading, and playing the digital audio content; and
at a predetermined time and date.

19. The electronic device of claim 13 wherein presenting the additional content further comprises at least one of presenting video, audio, text, and a web page.

20. The electronic device of claim 13 wherein in response to receiving the user's selection of one of the visual audio links, the playing of the digital audio content is paused and playback of the digital audio content is automatically continued when presentation of the additional content completes.

21. The electronic device of claim 20 wherein in response to receiving the user's selection of one of the visual audio links, the electronic device enables the user to scroll back and navigate to a previous position in the digital audio content where previous topics were mentioned.

22. The electronic device of claim 20 wherein enabling the user to scroll forward through the visual audio links provides the user with fast-forward rights.

23. The electronic device of claim 13 wherein the visual audio links are received with the digital audio content.

24. The electronic device of claim 13 wherein the visual audio links are received separately from the digital audio content.

25. A system, comprising:
a server comprising:
  memory; and
  a natural language processor executing on the server that is configured to:
    associate visual audio links with the terms of relevance detected in text of digital audio content, wherein each of the visual audio links is a reference to additional content associated with a corresponding term of relevance from the terms of relevance, and
    send the digital audio content, the visual audio links, and a license to the additional content over a network; and
an electronic device, having a memory and at least one processor, that receives the digital audio content over the network, the electronic device, further configured to:
  display the visual audio links associated with terms of relevance from the digital audio content, each visual audio link corresponding to a term of relevance displayed only as content having the term of relevance is played during playing of the digital audio content,
  in response to receiving a user's selection of one of the visual audio links, present the additional content associated with the corresponding term of relevance if the license associated with the additional content validates; and
  when presentation of the additional content completes, play the digital audio content at a point where the corresponding term of relevance was mentioned, such that the user is granted rewind rights based on the terms of relevance.

26. A system, comprising:
a server having memory and a natural language processor executing on the server that is operative to:
  receive digital audio content from a content provider;
  associate visual audio links with the terms of relevance detected in text of the digital audio content, wherein each of the visual audio links is a reference to additional content associated with a corresponding term of relevance from the terms of relevance;
  and send the visual audio links and a license to the additional content over a network; and
an electronic device having a display, a memory and at least one processor operatively in communication with the display and the memory, the electronic device operative to
  receive and play the digital audio content;
  display on the display the visual audio links associated with terms of relevance from content of the digital audio content, each visual audio link corresponding to a term of relevance displayed only as content having the term of relevance is played during playing of the digital audio content, wherein each of the visual audio links is a reference to additional content associated with a corresponding term of relevance from the terms of relevance;
  in response to receiving a user's selection of one of the visual audio links, presenting the additional content associated with the corresponding term of relevance, wherein the user is granted a license to the additional content; and
  when presentation of the additional content completes, playing the digital audio content at a point where the corresponding term of relevance was mentioned, such that the user is granted rewind rights based on the terms of relevance.

27. An executable software product stored on a computer-readable non-transitory medium containing program instructions for providing visual audio links with digital audio content, the program instructions for:
  playing the digital audio content on an electronic device, the electronic device having a display;
  displaying on the display the visual audio links associated with terms of relevance from content of the digital audio content, each visual audio link corresponding to a term of relevance displayed only as content having the term of relevance is played during playing of the digital audio content, wherein each of the visual audio links is a reference to additional content associated with a corresponding term of relevance from the terms of relevance;
  in response to receiving a user's selection of one of the visual audio links, presenting the additional content associated with the corresponding term of relevance, wherein the user is granted a license to the additional content; and when presentation of the additional content completes, playing the digital audio content at a point where the corresponding term of relevance was mentioned, such that the user is granted rewind rights based on the terms of relevance.

\* \* \* \* \*